United States Patent
Kaijala (10) Patent No.: US 9,632,525 B2
(45) Date of Patent: Apr. 25, 2017

(54) SHAFTLESS VEHICLE PEDAL WITH CONTACTING POSITION SENSOR

(71) Applicant: Murray Kaijala, Elkhart, IN (US)

(72) Inventor: Murray Kaijala, Elkhart, IN (US)

(73) Assignee: CTS CORPORATION, Lisle, IL (US)

( * ) Notice: Subject to any disclaimer, the term of this patent is extended or adjusted under 35 U.S.C. 154(b) by 29 days.

(21) Appl. No.: 14/606,663

(22) Filed: Jan. 27, 2015

(65) Prior Publication Data

US 2015/0128755 A1    May 14, 2015

Related U.S. Application Data

(63) Continuation-in-part of application No. 14/039,434, filed on Sep. 27, 2013, now Pat. No. 9,360,882.
(Continued)

(51) Int. Cl.
*G05G 1/38*    (2008.04)
*B60K 26/02*    (2006.01)
(Continued)

(52) U.S. Cl.
CPC ............... *G05G 1/38* (2013.01); *B60K 26/02* (2013.01); *G05G 25/04* (2013.01); *G05G 1/44* (2013.01); *Y10T 74/2054* (2015.01)

(58) Field of Classification Search
CPC .. G05G 1/30; G05G 1/38; G05G 1/44; G05G 5/03; Y10T 74/20528; Y10T 74/20888; B60K 26/02
See application file for complete search history.

(56) References Cited

U.S. PATENT DOCUMENTS 5,115,186 A    5/1992    Reinartz et al.
5,133,321 A    7/1992    Hering et al.
(Continued)

FOREIGN PATENT DOCUMENTS

DE    102010020314 A1    11/2011
EP    1094380 A2    4/2001
(Continued)

OTHER PUBLICATIONS

De Jager, Robert Jan, CTS2763PCT International Application No. PCT/US2015/013293 International Search Report and Written Opinion of the International Searching Authority, Dec. 10, 2015, Patent Cooperation Treaty.

*Primary Examiner* — Thomas Diaz
(74) *Attorney, Agent, or Firm* — Daniel Denefbourg (57) ABSTRACT

A vehicle pedal with a contacting position sensor. The pedal includes a housing with an interior housing wall that divides the housing into first and second interior housing chambers. The drum of the pedal arm is located in the first interior housing chamber and the sensor rotor is located in the second interior housing chamber. First and second housing side covers cover the first and second interior housing chambers respectively. The drum is mounted on and supported by the interior housing wall and the first housing cover for rotation of the drum in the first interior housing chamber relative to the pedal housing. A retainer with a pin and a clip extend through respective through-holes in the rotor and into respective slots in the drum and the clip engages against an interior shoulder in the drum for locking the rotor on the drum.

3 Claims, 6 Drawing Sheets

Related U.S. Application Data (60) Provisional application No. 61/932,842, filed on Jan. 29, 2014, provisional application No. 61/932,864, filed on Jan. 29, 2014.

(51) Int. Cl.
*G05G 25/04* (2006.01)
*G05G 1/44* (2008.04)

(56) References Cited

U.S. PATENT DOCUMENTS

| | | | |
|---|---|---|---|
| 5,416,295 A | 5/1995 | White et al. | |
| 5,768,946 A | 6/1998 | Fromer et al. | |
| 5,855,146 A * | 1/1999 | Papenhagen | B60K 26/02 74/560 |
| 5,887,488 A | 3/1999 | Riggle | |
| 6,003,404 A * | 12/1999 | Hannewald | F02D 11/02 74/512 |
| 6,089,120 A | 7/2000 | Lochle et al. | |
| 6,220,222 B1 | 4/2001 | Kalsi | |
| 6,370,983 B1 | 4/2002 | Nakamura | |
| 6,408,712 B1 | 6/2002 | Bolisetty et al. | |
| 6,412,364 B1 | 7/2002 | Berglar | |
| 6,418,813 B1 | 7/2002 | Lewis | |
| 6,460,429 B1 | 10/2002 | Staker | |
| 6,474,191 B1 | 11/2002 | Campbell | |
| 6,531,667 B2 | 3/2003 | Becker et al. | |
| 8,042,430 B2 | 10/2011 | Campbell | |
| 2003/0051571 A1 | 3/2003 | Staker | |
| 2003/0066375 A1 | 4/2003 | Menzies | |
| 2003/0070503 A1 | 4/2003 | Menzies | |
| 2004/0155647 A1 | 8/2004 | Green et al. | |
| 2005/0178234 A1 | 8/2005 | Saito et al. | |
| 2005/0267664 A1 | 12/2005 | Ouyang | |
| 2010/0077886 A1 | 4/2010 | Seiltz et al. | |
| 2010/0206122 A1 * | 8/2010 | Seiltz | G05G 1/38 74/512 |
| 2010/0313699 A1 | 12/2010 | Yoshida et al. | |
| 2011/0162481 A1 | 7/2011 | Campbell | |

FOREIGN PATENT DOCUMENTS

| | | |
|---|---|---|
| EP | 1428715 A2 | 6/2004 |
| EP | 1975760 A2 | 10/2008 |
| WO | 2006040339 A1 | 4/2006 |
| WO | 2006058344 | 6/2006 |

* cited by examiner

SHAFTLESS VEHICLE PEDAL WITH CONTACTING POSITION SENSOR

CROSS-REFERENCE TO RELATED AND CO-PENDING APPLICATIONS

This application is a continuation-in-part application which claims the benefit of the filing date and disclosure of co-pending U.S. patent application Ser. No. 14/039,434 filed on Sep. 27, 2013 which is incorporated herein by reference as are all references cited therein.

This application also claims the benefit of the filing date and disclosure of U.S. Provisional Patent Application Ser. No. 61/932,842 filed on Jan. 29, 2014 and U.S. Provisional Patent Application Ser. No. 61/932,864 filed on Jan. 29, 2014 which are both incorporated herein by reference as are all references cited therein.

FIELD OF THE INVENTION

The present invention relates generally to a vehicle pedal, and in particular, to a shaftless vehicle accelerator pedal with a contacting position sensor.

BACKGROUND OF THE INVENTION

Vehicle accelerator pedals have typically incorporated a pedal arm extending into a pedal housing and mounted for rotation on a shaft also extending into the housing as disclosed in, for example, U.S. Pat. No. 8,042,430 entitled "Accelerator Pedal for a Vehicle".

Vehicle accelerator pedals with contacting position sensors also incorporate a sensor rotor that is locked on the pedal arm following the setting of the idle output position of the sensor rotor.

The present invention is directed to a new and lower cost vehicle pedal with a contacting position sensor that incorporates features that allow the pedal arm to be supported in the pedal housing without the use of a shaft.

The present invention is also directed to a retainer with a pin and clip feature for retaining and locking the sensor rotor on the pedal arm following the setting of the idle output position of the sensor rotor.

SUMMARY OF THE INVENTION

The present invention is directed to a vehicle pedal comprising a pedal housing including an interior housing wall dividing the housing into first and second interior housing chambers, the Interior housing wall defining a through-hole, a pedal arm including a drum extending into the first interior housing chamber of the pedal housing, the drum including a neck projecting outwardly from one of the side faces thereof and defining a recess extending into the other of the side faces thereof, the neck of the drum extending through the through-hole defined in the interior housing wall of the pedal housing for mounting the drum for rotation in the first interior housing chamber relative to the pedal housing, a rotor located in the second interior housing chamber of the pedal housing, the rotor including a base that is secured to the one of the sides of the drum extending through the through-hole defined in the interior housing wall of the pedal housing, a first cover secured to the pedal housing and covering the first interior housing chamber, the cover including a plate with a collar projecting outwardly from an interior surface thereof and extending into the recess in the other of the sides of the drum for mounting the drum for rotation in the first interior housing chamber relative to the pedal housing, and a second cover secured to the pedal housing and covering and sealing the second interior housing chamber of the pedal housing.

In one embodiment, the base of the rotor defines at least first and second through-holes, the one of the sides of the drum defines at least first and second slots, and the drum defines an interior shoulder, at least a first pin and a clip projecting from a retainer plate and extending respectively through the first and second through-holes defined in the base of the rotor and into the respective first and second slots defined in the drum and the clip engaging with the interior shoulder in the drum for locking the index position of the rotor on the drum of the pedal arm.

In one embodiment, a first bearing is located between the neck of the drum and the interior partition wall and second bearing is located between the collar of the first cover and the drum for supporting the drum for rotation relative to the pedal housing.

The present invention is also directed to a vehicle pedal comprising a housing and a pedal including a drum extending into the housing and adapted for rotation relative to the housing, the drum including opposed first and second sides and the housing including a first housing wall opposite the first side of the drum and a second housing wall opposite the second side of the drum, a first recess defined in one of the first side of the drum or the first housing wall, a first collar defined in the other of the first side of the drum or the first housing wall, a second recess defined in one of the second side of the drum or the second housing wall, a second collar defined in the other of the second side of the drum or the second housing wall, and the first collar extending into the first recess and the second collar extending into the second recess for supporting the drum for rotation in the housing.

In one embodiment, first and second bearings surround the first and second collars for supporting the drum for rotation in the housing.

In one embodiment, a first collar on the first side of the drum extends into a first recess defined in the first housing wall and a second collar on the second housing wall extends into a second recess in the second side of the drum.

In one embodiment, the first housing wall is an interior wall that divides the housing into first and second interior housing chambers, the drum extending into the first interior housing chamber, a rotor located in the second interior housing chamber, first and second covers located over the first and second interior housing chambers respectively, the second cover defining the second housing wall, and the drum being supported by the interior housing wall and the first cover for rotation of the drum in the first interior housing chamber relative to the pedal housing.

In one embodiment, the rotor defines at least first and second through-holes, the one of the sides of the drum defines at least first and second slots, and the drum defines an interior shoulder, at least a first pin and a clip projecting from a support member and extending respectively through the first and second through-holes defined in the rotor and into the respective first and second slots defined in the drum and the clip engaging with the Interior shoulder in the drum for locking the index position of the rotor on the drum of the pedal arm.

The present invention is further directed to a vehicle pedal comprising a pedal housing including a housing wall with an interior surface and a rib projecting outwardly from the interior surface of the housing wall, a pedal arm including a drum extending into the pedal housing, and a friction lever located in the housing between the drum and the housing wall, the friction lever defining an arcuate recess, the rib extending into the recess and defining a primary axis for the pivoting of the friction lever relative to the housing wall and the pedal housing.

In one embodiment, the rib terminates in an arcuate tip, the arcuate tip of the rib and the arcuate recess defined in the friction lever being complimentary in shape.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENTS

FIGS. 1-9 depict a shaftless contacting sensor vehicle pedal 10 in accordance with the present invention which comprises, in part, a pedal housing and a pedal arm 22 extending into the pedal housing 20. Both the housing 20 and the pedal arm 22 may be made of a suitable molded plastic material.

The pedal housing 20 includes a generally circumferentially extending exterior housing wall 24 and an interior partition or divider housing wall 26 that projects outwardly from the interior surface of the exterior wall 24 and separates and partitions the interior of the pedal housing 20 into a first interior mechanical element chamber 28 and a second interior sensor or electrical element chamber 30. The exterior wall 24 and the partition wall 26 are oriented relative to each other in a generally normal relationship and the chambers 28 and 30 are disposed in a side-by-side relationship. The interior partition wall 26 defines a generally circular shaped through-hole or opening 32. A collar 34 surrounds the opening 32 and projects generally normally outwardly from the exterior surface of the interior wall 26 and into the first mechanical chamber 28. The exterior wall 24 of the housing 20 defines a front opening 36 which is in communication with and opens into the interior of the first interior chamber 28.

A plurality of mounting brackets 38 and a mounting clip 40 protrude from the exterior surface of the housing wall 24 and are adapted to allow mounting of the pedal housing 20 to the floor or mounting plate of the vehicle.

The elongate pedal arm 22 includes a foot pad 42 (FIG. 1) at a distal end thereof and a drum 44 at a proximal end thereof. The pedal arm 22 is mounted to the pedal housing 20 with the pedal arm 22 extending through the front opening 36 of the pedal housing 20 and the drum 44 of the pedal arm 22 located and adapted for rotation in the first interior chamber 28 of the pedal housing 20.

Figure 1:
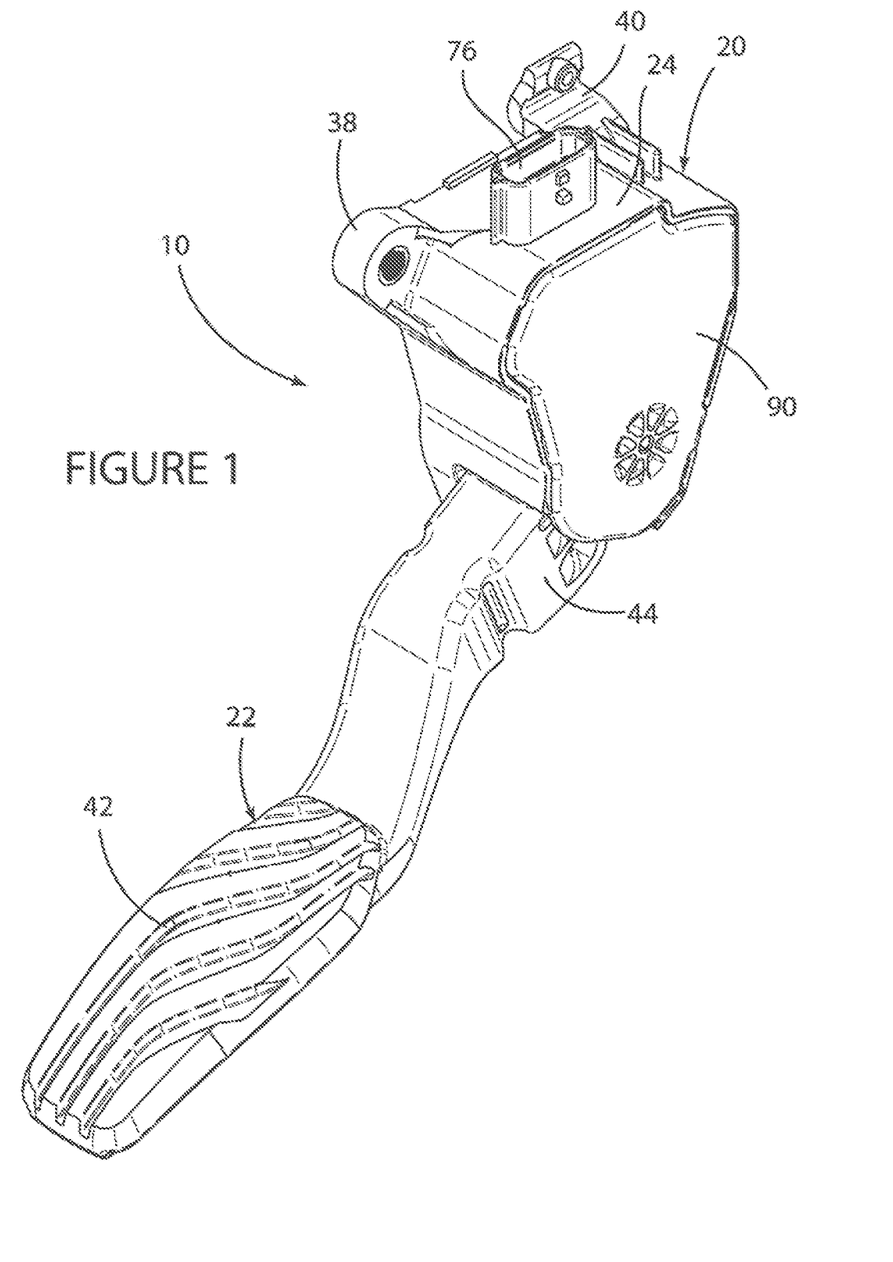
FIG. 1 is a perspective view of a vehicle pedal in accordance with the present invention.
Figures 2, 3:
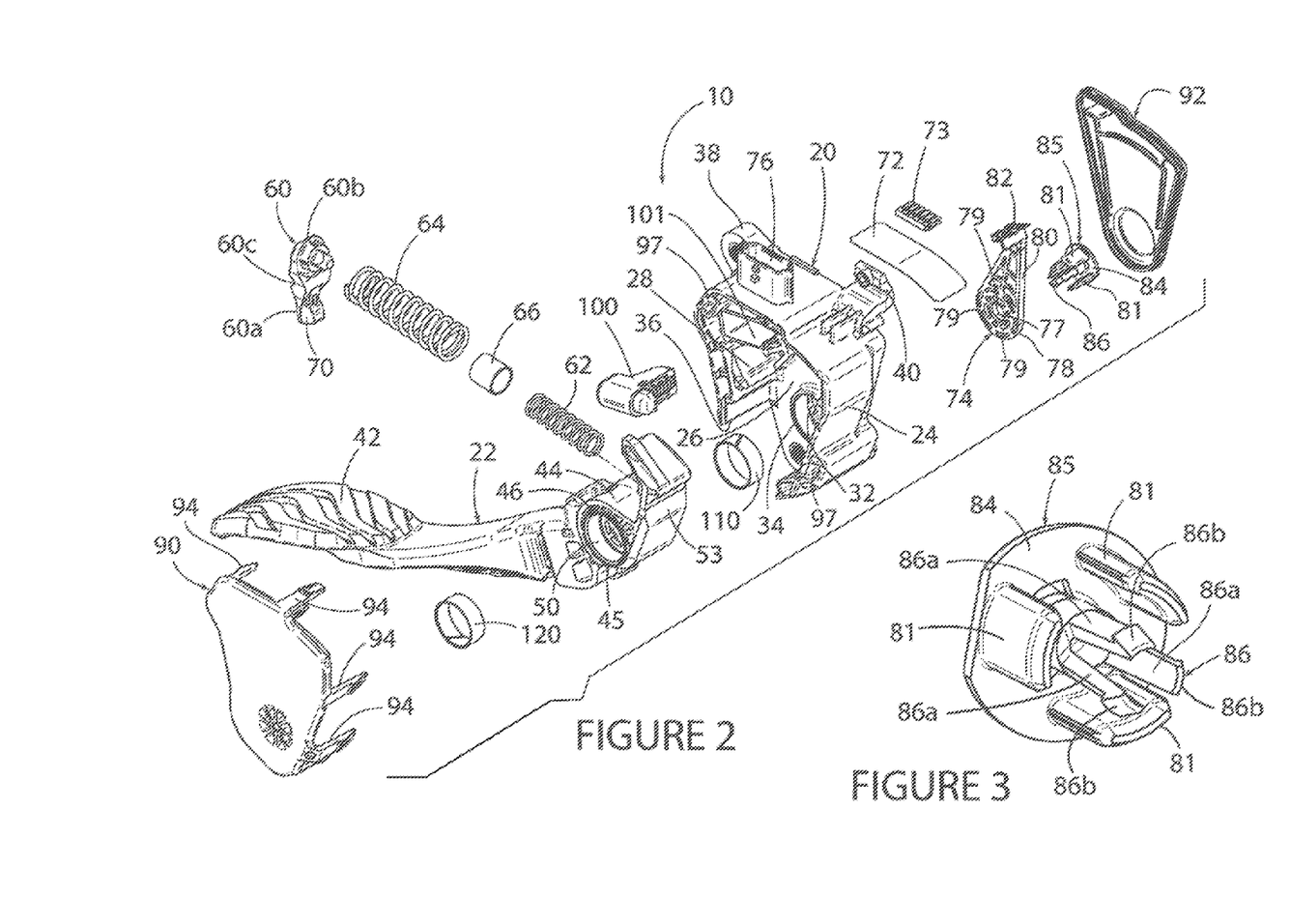
FIG. 2 is an exploded perspective view of the vehicle pedal in accordance with the present invention.
FIG. 3 is a perspective view of the rotor retainer of the vehicle pedal of the present invention.
Figure 4:
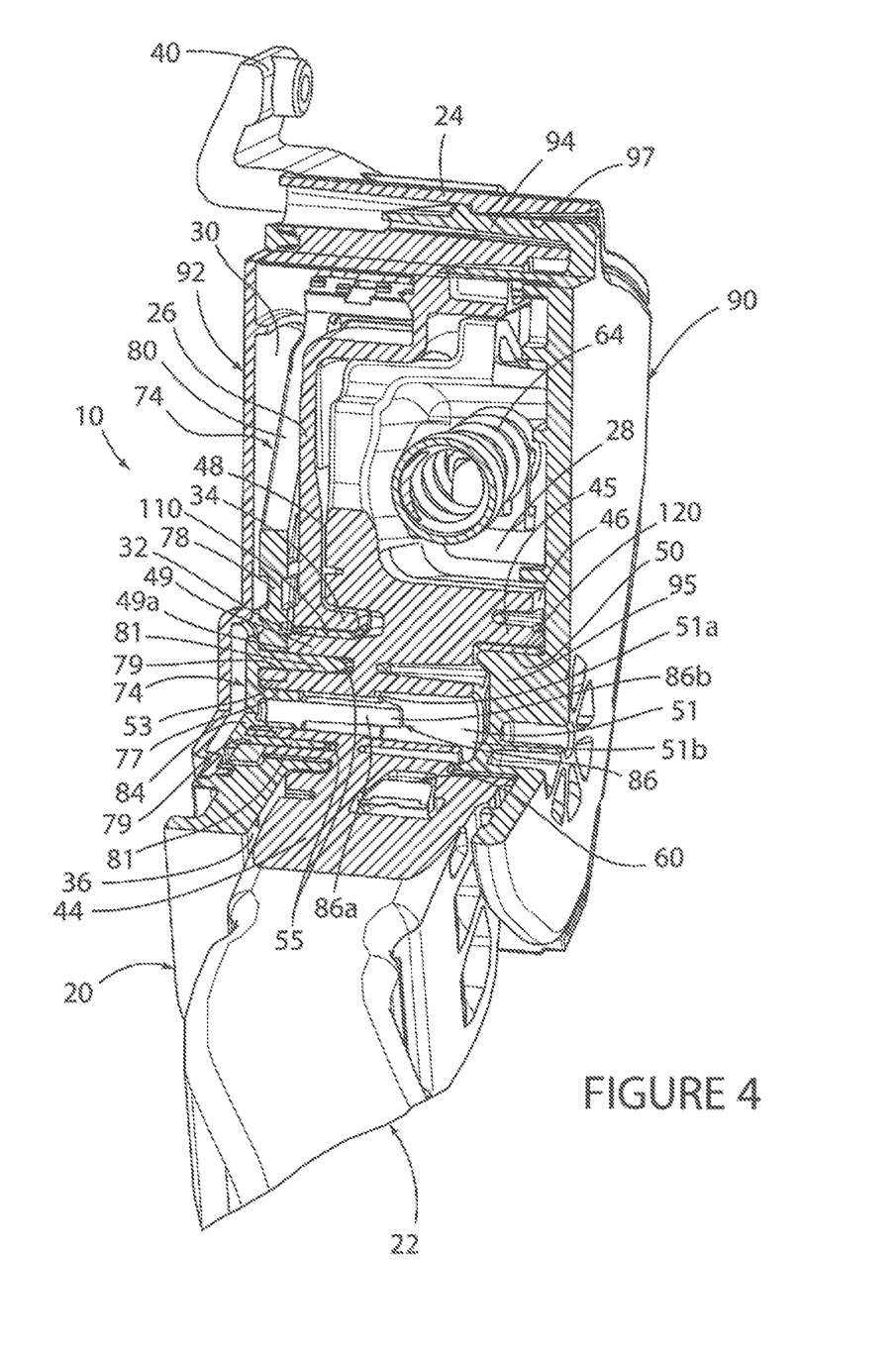
FIG. 4 is a broken, part horizontal, part vertical cross-sectional view of the vehicle pedal of the present invention.

Referring to FIGS. 2 and 4 in particular, the drum 44 of the pedal arm 22 includes opposed exterior side faces 46 and 48. The drum 44 includes an interior circumferential surface that defines a through-hole 51 extending centrally through the interior of the drum 44. The interior circumferential surface of the drum 44 includes two sections with different diameters and thus the drum 44 also includes an interior circumferentially extending shoulder 51a. A generally cylindrically shaped recess or groove 50 is defined and extends inwardly into the side face 46 of the drum 44. The recess or groove 50 in turn defines an open collar 45 projecting outwardly from the side face 46 of the drum 44. The drum through-hole 51 terminates in a circular opening 51b that is in communication with and opens into the recess or groove 50 in the side face 46 of the drum 44. The through-hole 51 has a diameter less than the diameter of the recess or groove 50.

Figures 7, 8, 9:
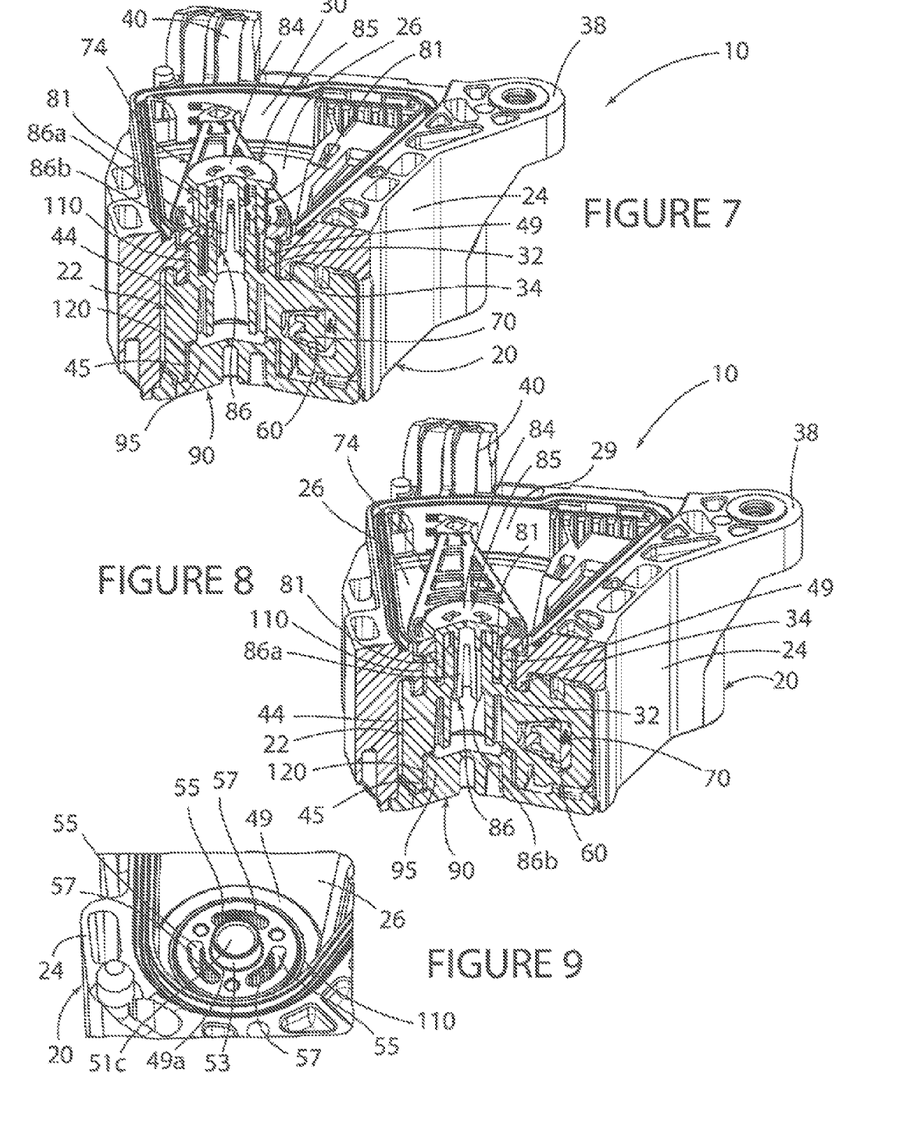
FIG. 7 is a broken, part perspective, part vertical cross-sectional view of the vehicle pedal of the present invention depicting the rotor prior to securement to the drum of the pedal arm.
FIG. 8 is a broken, part perspective, part vertical cross-sectional view of the vehicle pedal of the present invention with the retainer securing the rotor in its index position on the drum of the pedal arm.
FIG. 9 is a broken, enlarged perspective view of the pedal housing and the pedal drum depicting the rotor retainer pin slots defined in the side of the pedal drum of the vehicle pedal of the present invention.

Referring to FIGS. 4 and 9, a generally cylindrically shaped sleeve or neck or collar 49 projects outwardly from the opposed side face 48 of the drum 44 and terminates in a radial end face 49a. The through-hole 51 in the drum 44 terminates in a circular opening 51c in the radial end face 49a of the sleeve or neck or collar 49. A collar 53 projects outwardly from the radial end face 49a of the collar 49 and, more specifically, from the peripheral edge of the opening 51c in the radial end face 49a. The through-hole 51 extends through the collar 53. A plurality of generally arcuate and oval shaped elongated slots 55 extend into the radial end face 49a of the sleeve or neck or collar 49 in a relationship spaced from the collar 53 and the opening 51c. A plurality of teeth or ribs 57 project outwardly from the interior surface that defines the respective slots 55.

A spring platform 53 protrudes and extends unitarily outwardly from the front of the drum 44.

Figures 5, 6:
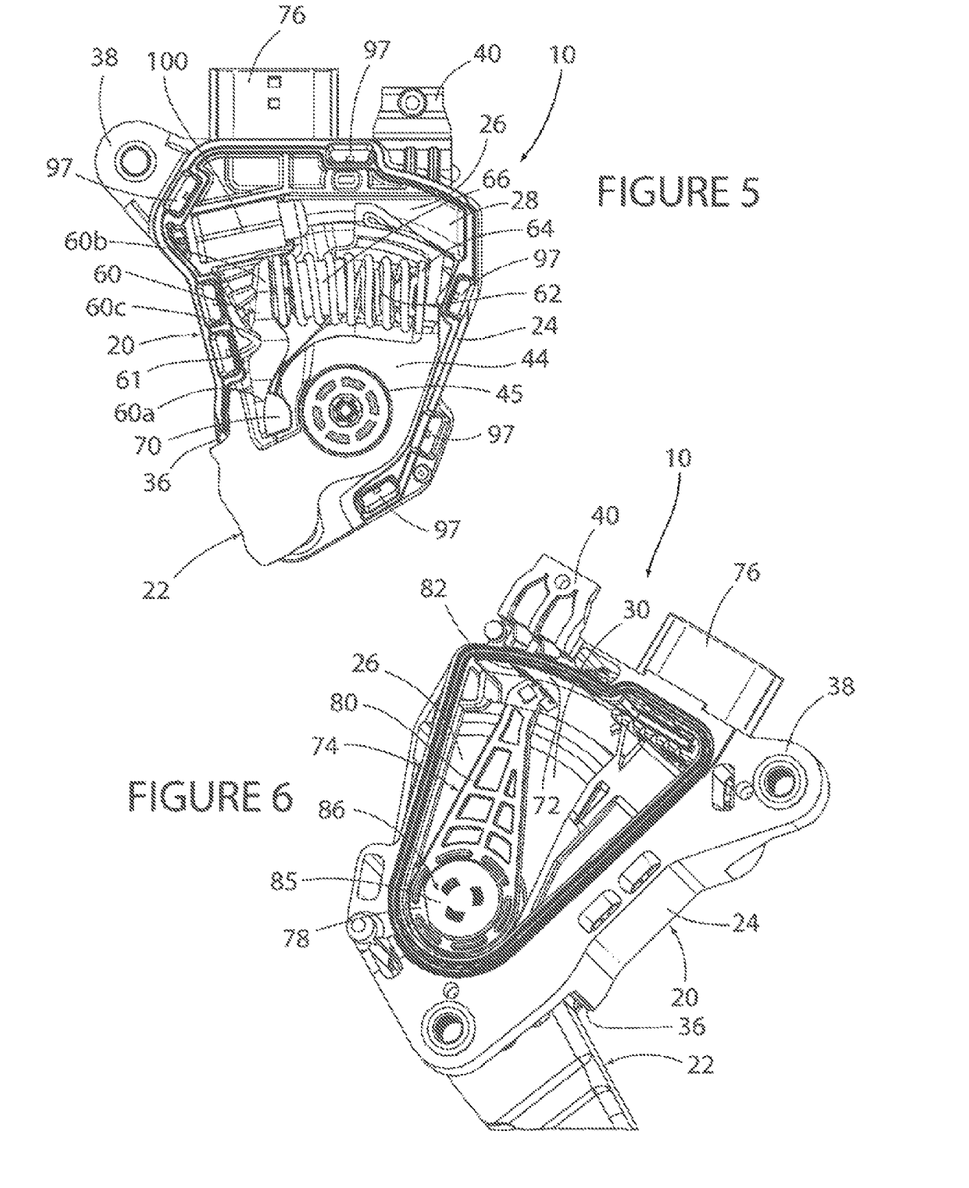
FIG. 5 is a broken, elevation view of one side of the vehicle pedal of the present invention without the mechanical element chamber cover and depicting the interior of the mechanical element chamber of the pedal housing.
FIG. 6 is a broken, elevation view of the other side of the vehicle pedal of the present invention without the electrical element chamber cover and depicting the interior of the electrical element chamber of the pedal housing.

Referring to FIGS. 2 and 5, the vehicle pedal 10 further comprises a pedal arm friction hysteresis assembly that includes a plastic molded friction lever or arm 60, a pair of elongate telescoping coil springs 62 and 64, and a spring dampener 66. The friction lever 60 is located and mounted in the first interior mechanical chamber 28 of the pedal housing 20 above the drum 44 and, more specifically between the top of the drum 44 and the interior surface of a top portion of the housing exterior wall 24, in a relationship abutting and pivoting against a cantilever type pivot or rib 61 (FIG. 5) projecting unitarily outwardly from the interior surface of the housing wall 24. The pivot or rib 61 includes and terminates in a convexly curved arcuate distal tip.

The friction lever 60 includes opposed ends 60a and 60b and defines a centrally located groove or recess or concavity 60c extending into the exterior top surface of the lever or arm 60. The groove or recess 60c is centrally located on the lever or arm 60 between the two ends 60a and 60b. The groove or recess 60c has a concavely curved arcuate shape and configuration that compliments the convexly curved arcuate shape and configuration of the distal tip of the housing pivot or rib 61. As shown in FIG. 5, the friction lever 60 includes a curved central body portion that follows the contour and the shape of the central recess or concavity 60c.

The pivot or rib 61 on the housing wall 24 extends into the groove or recess 60c into a relationship with the exterior surface of the distal tip thereof in abutting and nesting relationship with the exterior surface of the friction lever 60 defining the concavity 60c thereof and defines a primary cantilever or see-saw type axis or point for the pivoting of the lever 60 about and relative to the housing 20 and, more specifically, a primary pivot axis or point for the lever 60 about and relative to the housing wall 24. A friction pad 70 at the end 66 of the friction lever 60 is adapted for frictional abutting contact with respective exterior surfaces of the drum 44 of the pedal arm 22 as disclosed in for example U.S. Pat. No. 8,042,430, the disclosure and contents of which are incorporated herein by reference.

The spring 62 extends through the interior of the spring 64. The spring dampener 66 surrounds the inner spring 62 and is adapted to dampen the noise resulting from contact of the springs 62 and 64 during the operation of the pedal 10. The springs 62 and 64 are located and mounted in the first interior chamber 28 of the pedal housing 20 in front of the drum 44 and in a relationship wherein the springs 62 and 64 extend between, and the respective ends thereof are in abutting contact with, the Interior surface of the drum spring platform 50 and the end 60b of the friction lever 60 respectively.

In accordance with the operation of the vehicle pedal assembly 10, the rotation of the pedal arm 22 causes the rotation of the drum 44 and the drum platform 50 in a counter-clockwise direction which causes the springs 62 and 64 to contract and exert a force against the one end 60b of the friction lever 60 which, in turn, causes the opposite end 60a and the friction pad 70 thereon to exert a frictional force against the surface of the drum 44 for generating and transferring a pedal resistance or hysteresis force to the pedal arm 22.

Further details of the use, construction, and function of the pedal friction and hysteresis assembly of the pedal 10 can be found in U.S. Pat. No. 8,042,430 entitled "Accelerator Pedal for a Vehicle", the disclosure and contents of which are incorporated herein by reference.

Referring to FIGS. 2 and 5, the vehicle pedal 10 still further comprises a pedal arm kickdown assembly or module 100 that is mounted in the first interior housing chamber 28 and, more specifically, that is mounted in a kickdown module receptacle 28a defined in the interior housing chamber 28. Further details of the use, construction, and function of the kickdown module 10 can be found in U.S. Pat. No. 6,418,813 entitled "Kickdown Mechanism for a Pedal", the disclosure and contents of which are expressly incorporated herein by reference.

Referring to FIGS. 2 and 6, the vehicle pedal 10 still further comprises a contacting pedal position sensor assembly that includes an elongate strip of Kapton flexible film 72 having a series of resistor and conductor tracks (not shown), a metal film clip 73, a contacting potentiometer structure in the form of an adjustable elongate plastic molded contactor rotor 74, and terminals (not shown) in the interior of a connector terminal housing or shroud 76.

The rotor 74 includes a generally circular base 78, an elongate contactor arm 80 that projects outwardly from the base 78, and metal contactors 82 at the distal end of the arm 80 of the rotor 74. The rotor base 78 includes a generally cylindrically shaped and centrally located through-hole 77 (FIG. 2). The rotor base 78 also defines one or more arcuate and generally oval shaped through-holes or slots 79. The embodiment shown includes three separate generally arcuate and oval shaped through-holes 79 extending around the central through-hole 77 in a spaced apart relationship. The through-holes 79 are spaced radially from the central through-hole 77.

The strip of flexible film 72 is located and mounted in the second interior chamber 30 of the pedal housing 20 against the interior surface of a back portion of the housing wall 24 (FIG. 6). The connector housing or shroud 76 protrudes outwardly from the exterior surface of the back portion of the housing wall 24. Connector terminals (not shown) extend through the connector housing 76 into the second interior housing chamber 30 and into contact with the strip of Kapton flexible film 72. The rotor 74 is located and mounted in the second interior chamber 30 of the pedal housing 20 with the base 78 of the rotor 74 secured to the neck 49 of the drum 44 of the pedal arm 22 and the metal contactors 82 in abutting and sliding contact against the surface of the film 72.

Further details of the use, construction, and function of the contacting position sensor assembly 70 can be found in U.S. Pat. No. 8,042,430 entitled "Accelerator Pedal for a Vehicle", the disclosure and contents of which are incorporated herein by reference The vehicle pedal 10 still further comprises one or more plastic elongate, arcuate and generally oval shaped retainer pins 81 that are adapted for retaining and securing the rotor 74 to the drum 44 of the pedal arm 22 following the setting of the index idle output position of the rotor 74. The embodiment shown includes three retainer pins 81. The respective retainer pins 81 each have a width less than the length of the respective slots 55 defined in the drum 44 of the pedal arm 22.

Further, in the embodiment shown, the retainer pins 81 are part of a retainer 85 and the retainer pins 81 protrude generally normally and unitarily outwardly from the lower exterior surface of a generally circular support or retainer plate 84. An elongate central clip 86 also protrudes generally normally and unitarily outwardly and centrally from the lower exterior surface of the base support or retainer plate 84. The elongate clip 86 is located centrally on the base support or retainer plate 84 and the retainer pins 81 extend around the clip 86 in a spaced apart and parallel relationship to each other and the clip 86. The clip 86 is comprised of a plurality of elongate and flexible clip arms 86a that terminate in respective sloped and shouldered clip ends or fingers 88b.

The vehicle pedal 10 and, more specifically, the pedal housing 20, still further comprises a first mechanical element chamber cover plate 90 and a second sensor element chamber cover plate 92. The plates 90 and 92 define respective side walls of the housing 20 when the plates 90 and 92 are coupled to the housing wall 26. The interior surfaces of the respective housing plates or side walls 90 and 92 are located opposite the exterior surface of the respective sides 46 and 48 of the drum 44.

The cover plate 90 is made of the same plastic material as the plastic housing 20 and includes a plurality of spaced-apart mounting clips or snap tabs 94 protruding generally normally from the peripheral edge thereof, and a generally cylindrically shaped sleeve or collar or neck 95 (FIG. 2) protruding unitarily outwardly from the interior surface of the cover plate 90. The cover plate 90 is adapted to be snap fitted over and cover the first interior mechanical element chamber 28 of the pedal housing 20. Specifically, the mounting clips 94 on the cover plate 90 are extended and snap fitted into corresponding mounting clip receiving clip apertures 97 (FIGS. 2, 4, and 5) defined in the peripheral redial edge of the exterior wall 24 of the pedal housing 20 for securing the cover plate 90 to the pedal housing 20.

The cover plate 92 is preferably made of a metal material and is adapted to be ultrasonically welded and mounted to the opposed peripheral edge of the housing wall 24 to cover the second interior sensor element chamber 30 of the pedal housing 20. The use of a pedal housing 20 with a cover plate 92 that is ultrasonic welded to the housing wall 24 in combination with an interior housing wall 26 creates and defines an interior electrical and sensor element chamber 30 that is protected not only from the environment exterior to the cover plate 92 but also from the environment internal to the mechanical element housing chamber 28.

According to the present invention and as shown in FIGS. 2 and 3, the pedal arm 22 is mounted to the pedal housing 20, and more specifically, the drum 44 of the pedal arm 22 is mounted in the first interior housing chamber 28 of the pedal housing 20 in a relationship with the neck or collar 49 of the pedal arm drum 44 extended and located in the collar 34 and the through-hole 32 defined in the interior partition wall 26 of the pedal housing 20.

A ring shaped polymer bearing 110 surrounds the neck or collar 49 of the drum 44 and supports the drum 44 for rotation relative to the interior partition wall 26 and thus supports the drum 44 for rotation in the first interior housing chamber 28 relative to the pedal housing 20. Thus, in the embodiment shown, the bearing 110 surrounds and is abutted against the exterior surface of the drum collar 49 and the housing collar 34 surrounds and is abutted against the exterior surface of the bearing 110. The drum collar 49 is thus rotatable relative to the housing collar 34 and thus the drum 44 is rotatable relative to the housing 20 in response to the rotation of the pedal arm 22.

Thereafter, the elements of the friction hysteresis assembly 59 and the vehicle pedal kickdown assembly 100 are located and mounted in the first interior housing chamber 28.

The cover plate 90 is then mounted and secured to the pedal housing 20 into a relationship with the neck or collar or sleeve 95 on the cover plate 90 extending into the collar 45 and the recess 50 in the side 48 of the drum 44 of the pedal arm 22.

A ring shaped polymer bearing 120 surrounds the neck 95 on the cover 90 and supports the drum 44 for rotation relative to the cover plate 90 and thus supports the drum 44 for rotation in the first interior housing chamber 28 relative to the pedal housing 20. Thus, the bearing 120 surrounds and is abutted against the exterior surface of the housing or cover collar 95 and the drum collar 45 surrounds and is abutted against the exterior surface of the bearing 120. The drum 45 is thus rotatable relative to the housing or cover collar 95.

Thus, and as described above, the respective collars 34 and 95 on the respective housing cover plate 90 and interior partition wall 26 of the housing 20 extend into the respective opposed sides of the drum 44 for supporting the drum 44 and thus the pedal arm 22 for rotation about and relative to the pedal housing 20.

Stated another way, the use of a drum 44, a pedal housing wall 26, and a housing cover 90 with the features as described above allow the drum 44 of the pedal arm 22 to be mounted and supported for rotation relative to the pedal housing 20 without the use of a separate shaft extending through the drum as disclosed in for example U.S. Pat. No. 8,042,430 entitled "Accelerator Pedal for a Vehicle" and thus defines and creates a shaftless pedal 10.

The elements of the contacting position sensor assembly 70 are located and mounted in the second interior housing chamber 30 of the pedal housing 20. Particularly, the base 78 of the rotor 74 is located in a relationship overlying and abutting against the radial end face 49a of the neck 49 of the drum 44 protruding through the through hole 32 in the interior wall 26 of the pedal housing 20 and, still more specifically, in a relationship with the through-holes 79 in the base 78 of the rotor 74 overlying and in co-linear relationship with the respective slots 55 defined in the neck 49 of the drum 44.

Thereafter, the index output position of the rotor 74 is set by rotating the rotor 74+/−2 degrees to the desired index output position with the contactors 82 against the surface of the resistive film 72. Once the idle output position has been set, the retainer 85, and more specifically the retainer plate 84 and retainer pins 81 thereof, are pushed or pressed axially downwardly or inwardly through the respective through-holes 79 in the rotor base 78 and into the respective slots 55 in the neck 49 of the drum 44 into a relationship wherein the retainer 85 and, more specifically, the retainer plate 84 thereof, is abutted against the exterior surface of the base 78 of the rotor 74 and the outer surface of the respective pins 81 is abutted and press-fitted against the plurality of ribs or teeth 57 in the respective slots 55 in the neck 49 of the drum 44 for securing and locking the respective pins 81 in the respective slots 55 in the drum 44 which in turn secures and locks the rotor 74 to the drum 44 which in turn secures and locks the rotor 74 in its index position on and to the drum 44.

Additionally, the clip 86 on the retainer plate 84 is pushed or pressed axially downwardly initially through the through-hole 77 defined in the rotor base 78 and then through the through-hole 51 extending through the interior of the drum 44 of the pedal arm 22 which causes the clip arms 88 to initially move inwardly towards each other and then subsequently outwardly away from each other after the clip fingers 89 clear the interior drum shoulder 51a which locks the clip 86 to the drum 44 of the pedal arm 22 which locks the retainer 85 to the drum 44 which in turn locks the rotor 74 to the drum 44 of the pedal arm 22.

The length of the respective slots 55 in the neck 49 on the side 48 of the drum 44 limit the idle output adjustment of the rotor 74 to a maximum of +/−2 degrees.

The cover plate 92 is then mounted to the pedal housing 20 in a relationship covering the second interior housing chamber 30 and secured to the peripheral radial end edge of the wall 24 of the pedal housing 20 by ultrasonic welding or the like method for covering and protecting the electrical and sensor elements located in the electrical or sensor element chamber 30 of the housing 20.

Figure 10:
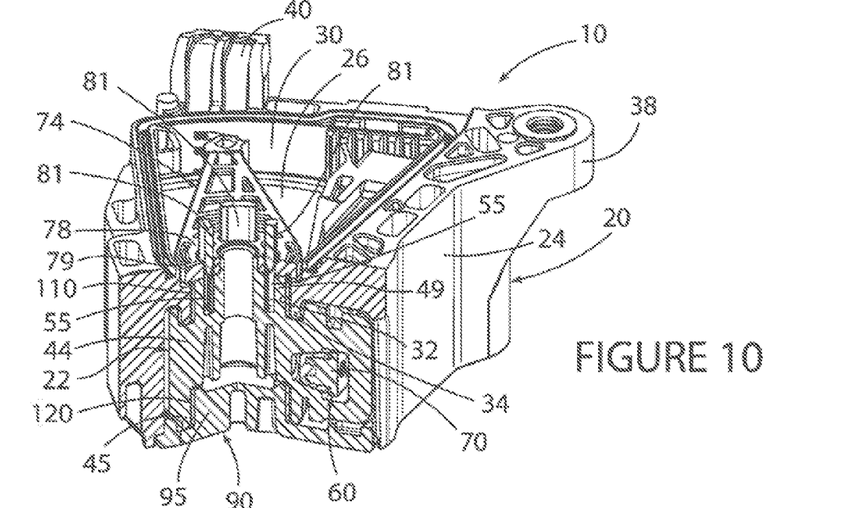
FIG. 10 is a broken, part perspective, part vertical cross-sectional view of the vehicle pedal of the present invention with another retainer pin embodiment and depicting the rotor prior to securement to the drum of the pedal arm.
Figure 11:
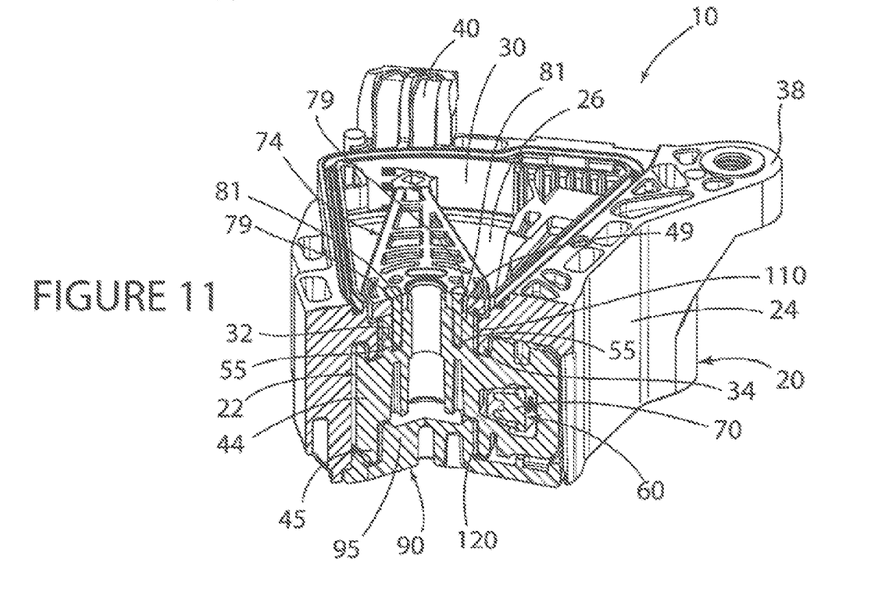
FIG. 11 is a broken, part perspective, part vertical cross-sectional view of the vehicle pedal with the retainer pin embodiment shown in FIG. 10 and the rotor in its secured index position on the drum of the pedal arm.

FIGS. 10 and 11 depict the vehicle pedal 10 of the present invention incorporating a rotor retainer embodiment in which the retainer pins 81 are not part of a retainer 85 but rather are of the individual shear type disclosed in for example in FIGS. 10, 11, and 12 of co-pending US Patent Publication No. US 2014/0090512, the disclosure and contents of which are incorporated herein by reference.

More particularly, in the embodiment of FIGS. 10 and 11 of the present application, each of the retainer pins 81 is a shear type pin that is unitary and integral and molded as part of the base 78 of the rotor 74 by a thin section or region of plastic material (not shown) extending between the base 78 of the rotor 74 and the outer surface of each of the pins 81.

Once the idle position of the rotor 74 has been set as described above with respect to FIGS. 7 and 8 and incorporated herein by reference, the pins 81 are pushed or pressed axially downwardly to shear or tear the pins 81 away from the plastic material that secures the pins 81 to the base 78 of the rotor 74 and then the pins 81 are pushed or pressed further axially downwardly through the respective slots 79 defined in the base 78 of the rotor 74 and then into and through the respective slots 55 defined in the collar 53 in the side 48 of the drum 44 in the same manner as described above with respect to the pins 81 shown in FIGS. 7 and 8 and incorporated herein by reference for coupling the rotor 74 to the drum 44.

Numerous variations and modifications of the vehicle pedal described above may be effected without departing from the spirit and scope of the novel features of the invention. It is thus understood that no limitations with respect to structure of the vehicle pedal illustrated herein are intended or should be inferred. It is, of course, intended to cover by the appended claims all such modifications as fall within the scope of the claims.

I claim:

1. A vehicle pedal comprising:
 a pedal housing including an interior housing wall dividing the housing into first and second interior housing chambers, the Interior housing wall defining a through-hole;
 a pedal arm including a drum extending into the first interior housing chamber of the pedal housing, the drum including a neck projecting outwardly from one of the side faces thereof and defining a recess extending into the other of the side faces thereof, the neck of the drum extending through the through-hole defined in the interior housing wall of the pedal housing for mounting the drum for rotation in the first interior housing chamber relative to the pedal housing;
 a rotor located in the second interior housing chamber of the pedal housing, the rotor including a base that is secured to the one of the sides of the drum extending through the through-hole defined in the interior housing wall of the pedal housing;
 a first cover secured to the pedal housing and covering the first interior housing chamber, the cover including a plate with a collar projecting outwardly from an interior surface thereof and extending into the recess in the other of the sides of the drum for mounting the drum for rotation in the first interior housing chamber relative to the pedal housing;
 a second cover secured to the pedal housing and covering and sealing the second interior housing chamber of the pedal housing; and
 the base of the rotor defining at least first and second through-holes, the one of the sides of the drum defines at least first and second slots, and the drum defining an interior shoulder, at least a first pin and a clip projecting from a retainer plate and extending respectively through the first and second through-holes defined in the base of the rotor and into the respective first and second slots defined in the drum and the clip engaging with the Interior shoulder in the drum for locking the index position of the rotor on the drum of the pedal arm.

2. The vehicle pedal of claim 1 further comprising a first bearing located between the neck of the drum and the interior housing wall and second bearing between the collar of the first cover and the drum for supporting the drum for rotation relative to the pedal housing.

3. A vehicle pedal comprising:
 a pedal housing;
 a pedal arm including a drum unitary with the pedal arm and extending into the pedal housing;
 a rotor separate from the pedal arm and extending into the pedal housing the rotor including a base with an exterior side face, an elongate contactor arm unitary with and projecting outwardly from the base, and a contactor at a distal end of the contactor arm in contact with a strip of film located in the pedal housing, the base of the rotor overlying and secured to one of the sides exterior side faces of the drum;
 the base of the rotor defining at least first and second spaced apart and generally parallel through-holes, the one of the exterior side faces of the drum defining at least first and second slots, and the drum defines an interior shoulder; and
 a retainer separate from the rotor and the drum and including at least a first pin and a clip unitary with and projecting generally normally outwardly from a support retainer plate in a spaced apart and generally parallel relationship, the retainer plate overlying and abutting against the exterior side face of the base of the rotor and the first pin and the clip extending respectively through the first and second through-holes defined in the rotor and into respective first and second spaced apart and generally parallel slots defined in the one of the exterior side faces of the drum and in alignment with the first and second through-holes defined in the rotor respectively and the clip engaging with the interior shoulder in the drum for retaining and locking the index position of the rotor on the drum of the pedal arm.

* * * * *